March 7, 1933.    P. P. MILLER    1,900,724
RAKE TOOTH FOR HAY LOADERS
Filed June 10, 1932
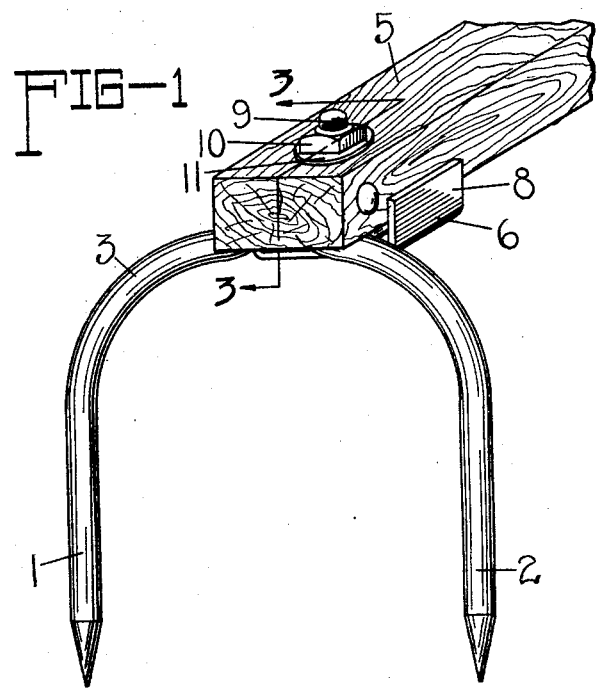
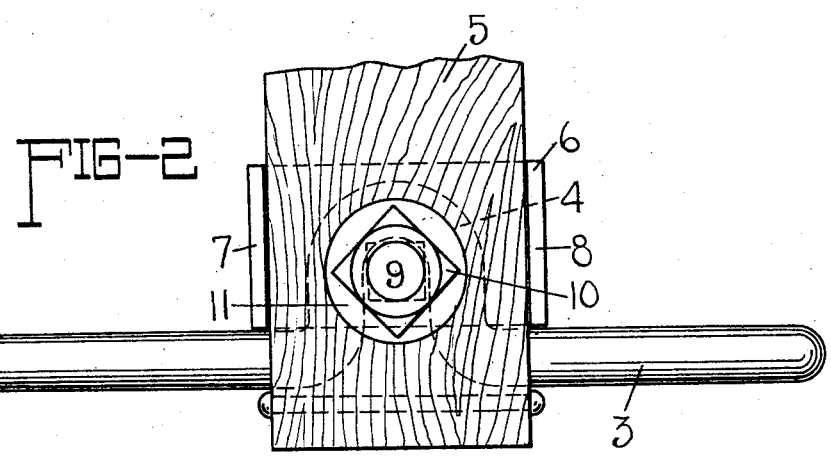
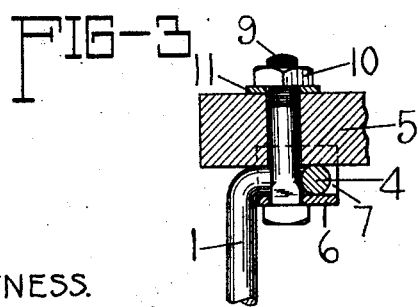
WITNESS.
Edward Melin.
INVENTOR.
PAUL P. MILLER.
BY
W.C. Johnston
ATTORNEY.

Patented Mar. 7, 1933

1,900,724

UNITED STATES PATENT OFFICE

PAUL P. MILLER, OF OTTUMWA, IOWA, ASSIGNOR TO DAIN MANUFACTURING COMPANY OF IOWA, OF OTTUMWA, IOWA, A CORPORATION OF IOWA

RAKE TOOTH FOR HAY LOADERS

Application filed June 10, 1932. Serial No. 616,387.

My invention relates to hay loaders of the raker bar type in which cured hay is gathered and delivered to a wagon, or similar vehicle, by a series of reciprocating bars on the rear ends of which are mounted teeth to gather hay to the conveying body of a loader. My invention relates particularly to the gathering or raking teeth on the reciprocating bars, and has for its object to provide a tooth of a simple but improved form together with the means employed to secure the tooth to the raker bar.

Referring to the drawing in which similar numerals indicate identical parts: —

Figure 1 is a view in perspective of the raking end of a raker bar showing my improved tooth and the means employed to secure it on the bar;

Figure 2 is an enlarged plan view of Figure 1; and,

Figure 3 is a section in detail on the line 3—3 of Figure 1.

The tooth is an inverted U in form, the sides of which are vertical prongs 1 and 2 having pointed ends. Centrally the arc 3 of the U is bent substantially at a right angle to the main portion of the arc and forms a loop 4, as shown in dotted lines in Figure 2. The raker bar 5, in this instance is made of suitable timber against the under side of which the loop is closely held by a metallic clamp 6 extending transversely of the bar 5 below the loop. The ends 7 and 8 of the clamp are bent to embrace the sides of the bar 5 and centrally of the clamp is a bolt 9 extending upwardly through a suitable hole in the center of the clamp 6 and through the loop 4 and the bar 5. On the upper and threaded end of the bolt 9 is a nut 10 and between the nut 10 and the bar 5 is a washer 11.

By operation of the nut 10 the parts of my device are drawn together and held rigidly in place. The flanges 7 and 8 of the clamp 6, embracing the bar 5 resist any lateral or turning movement of the clamp, and as the arc 3 of the tooth contacts with the flanges 7 and 8 the tooth is also held rigidly from turning on the bolt 9.

My device is simple and economical in construction and operation and is a desirable structure in raker bar hay loaders, in that it operates more effectively in gathering hay to the loader of a raker bar type, and is easily and readily attached to or detached from a raker bar, only one bolt being utilized in the structure to hold the parts together.

What I claim is:—

1. The combination with a raker bar of a hay loader, of an inverted U-shaped tooth having dual prongs, a loop formed in the arc of the tooth and bent substantially at a right angle thereto, a clamp confining said loop and having flanges embracing the bar and in forceful contact with the tooth, and a bolt extending through the clamp, the loop and said bar to hold the clamp and tooth in rigid position on the bar.

2. The combination with a raker bar of a hay loader, of an inverted U-shaped tooth having dual prongs, a loop formed in the arc of the tooth and bent therefrom in a plane substantially at a right angle to the vertical plane of the prongs, a clamp confining said loop against the bar, a flange on either side of the clamp embracing the bar and in forceful contact with the arc of the tooth, a perforation in the clamp and in the bar, a bolt extending through the hole in the clamp and in the bar, and a nut on the end of the bolt operative to draw the parts together and hold them in rigid relation.

In witness whereof, I hereunto subscribe my name this 31st day of May, 1932.

PAUL P. MILLER.